United States Patent
Yazdani et al.

(10) Patent No.: US 10,402,306 B2
(45) Date of Patent: Sep. 3, 2019

(54) PARALLEL TRACING

(71) Applicant: Futurewei Technologies, Inc., Plano, TX (US)

(72) Inventors: Reza Yazdani, Los Altos, CA (US); Chen Tian, Union City, CA (US)

(73) Assignee: Futurewei Technologies, Inc., Plano, TX (US)

(*) Notice: Subject to any disclaimer, the term of this patent is extended or adjusted under 35 U.S.C. 154(b) by 288 days.

(21) Appl. No.: 15/156,483

(22) Filed: May 17, 2016

(65) Prior Publication Data
US 2017/0337113 A1  Nov. 23, 2017

(51) Int. Cl.
G06F 9/44     (2018.01)
G06F 11/36    (2006.01)

(52) U.S. Cl.
CPC ................ *G06F 11/3636* (2013.01)

(58) Field of Classification Search
CPC .......................................... G06F 9/44
USPC .................................. 717/128–133
See application file for complete search history.

(56) References Cited

U.S. PATENT DOCUMENTS

| | | | | |
|---|---|---|---|---|
| 5,870,539 A * | 2/1999 | Schaffer | ............. | G06F 11/3672 714/38.13 |
| 5,983,366 A * | 11/1999 | King | ................ | G06F 11/3636 714/38.13 |
| 6,230,313 B1 | 5/2001 | Callahan, II et al. | | |
| 6,381,739 B1 * | 4/2002 | Breternitz, Jr. | ......... | G06F 8/443 714/37 |
| 6,467,083 B1 * | 10/2002 | Yamashita | .......... | G06F 11/3466 711/156 |
| 6,738,965 B1 * | 5/2004 | Webster | ............. | G06F 11/3636 714/E11.212 |
| 7,032,133 B1 * | 4/2006 | Lang | ..................... | G06F 11/263 714/32 |
| 8,756,461 B1 * | 6/2014 | Jacob | ................... | G06F 11/3476 714/45 |
| 2005/0044538 A1 * | 2/2005 | Mantripragada | ....... | G06F 8/443 717/151 |
| 2008/0162272 A1 * | 7/2008 | Huang | ................ | G06F 11/3409 717/127 |
| 2009/0037887 A1 * | 2/2009 | Chavan | ............... | G06F 11/3636 717/128 |
| 2009/0172644 A1 * | 7/2009 | Nagarajan | ................ | G06F 8/33 717/128 |
| 2013/0205286 A1 | 8/2013 | Barraclough et al. | | |

(Continued)

FOREIGN PATENT DOCUMENTS

CN    104081361 A    10/2014

OTHER PUBLICATIONS

PCT/CN2017/083499, ISR, Jul. 27, 2017.

*Primary Examiner* — Jae U Jeon
(74) *Attorney, Agent, or Firm* — Vierra Magen Marcus LLP

(57) ABSTRACT

A device for tracing a computer program comprises a non-transitory memory having instructions and one or more processors in communication with the memory. The one or more processors execute the instructions to generate trace code from a trace specification program to trace the computer program. The one or more processors calculate values by executing the computer program and the trace code records, in parallel, the values at a predetermined location in execution of the computer program.

12 Claims, 7 Drawing Sheets

(56) References Cited

U.S. PATENT DOCUMENTS

| | | | |
|---|---|---|---|
| 2013/0332905 A1* | 12/2013 | Vikutan | G06F 11/3684 717/124 |
| 2014/0237454 A1* | 8/2014 | Delporte | G06F 11/3636 717/128 |
| 2016/0239408 A1* | 8/2016 | Sule | G06F 11/3688 |

* cited by examiner

PARALLEL TRACING

BACKGROUND

Computer tracing (or tracing) relates to recording information about a computer program's execution, such as recording the value or state of particular variables or functions at particular times during execution. Tracing may be a specialized form of logging, and may be useful in debugging, code security, performance analysis and other applications.

Typically, a computer programmer or user is responsible for writing the trace code. The process is typically done manually or automated by programming a software or hardware tool to observe execution. For example, users may manually insert code to record the information helpful to them in the source code. This auxiliary code is put under a DEBUG flag and is eliminated in the released version of the computer program. In another example, a compiler may automatically generate code to record needed information. In both examples, large amounts of trace information may be created that may be very difficult to analyze without tools.

Dynamic binary instrumentation tools may also be used. Instrumentation is performed at run time on the compiled binary files. Binary modification of the code is tricky, very intrusive and may alter the behavior or performance of the computer program, such as adding to execution time. Further, the computer program may need to be recompiled and rebuilt.

Tracing may effect the behavior of the computer program in DEBUG mode and RELEASE mode, and as a consequence may mask a bug. Tracing may also add to the execution time of the computer program because of the overhead of executing extra code. It is desirable to have tools to help in testing and analyzing a computer program at run time, without side effects on the computer program behavior.

SUMMARY

A device for tracing a computer program comprises a non-transitory memory having instructions and one or more processors in communication with the memory. The one or more processors execute the instructions to generate trace code from a trace specification program to trace the computer program. The one or more processors calculate values by executing the computer program and the trace code records, in parallel, the values at a predetermined location in the execution of the computer program.

In an embodiment, the present technology relates to a computer-implemented method for tracing a computer program that comprises generating, with one or more processors, trace computer instructions to record information calculated by the computer program. The trace computer instructions are inserted in the computer program at a predetermined location specified by a trace specification program. The computer program is executed which initiates an execution of the trace computer instructions in parallel. The trace computer instructions record the information calculated by the computer program at the predetermined location in the execution of the computer program. A linker may insert the trace computer instructions specified by the trace specification program.

In a further embodiment, the present technology relates to a non-transitory computer-readable medium storing computer instructions, that when executed by one or more processors, cause the one or more processors to perform steps. The steps include define a trace specification program having a trace instruction, a thread instruction and an output format in a trace specification file. In an embodiment, a trace instruction includes a command to a linker to add trace instructions at a predetermined location in the execution of a program object. The trace specification program is compiled to obtain the trace object having the trace instructions. The program object is generated and linked to the trace object. The program object is executed in the first thread which initiates the execution of the trace object in the second thread in response to thread instructions. The second thread is usually different from the first thread. Specified information regarding the execution of the program object is output in the output format to trace media, such as a trace file.

In yet another embodiment, a device for tracing a computer program comprises a first register to store an address of a trace function and a second register to store an address of a queue. A non-transitory memory stores the computer program including a call to the trace function and the queue. One or more processors in communication with the non-transitory memory, first register and second register execute the instructions to calculate values by executing the computer program in a first thread. The address of the trace function stored in the first register is written to the address of the queue stored in the second register in response to the execution of the call to the trace function in the computer program. The address of the trace function is retrieved from the queue in a second parallel thread and the trace function is executed in the second parallel thread to record the values.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
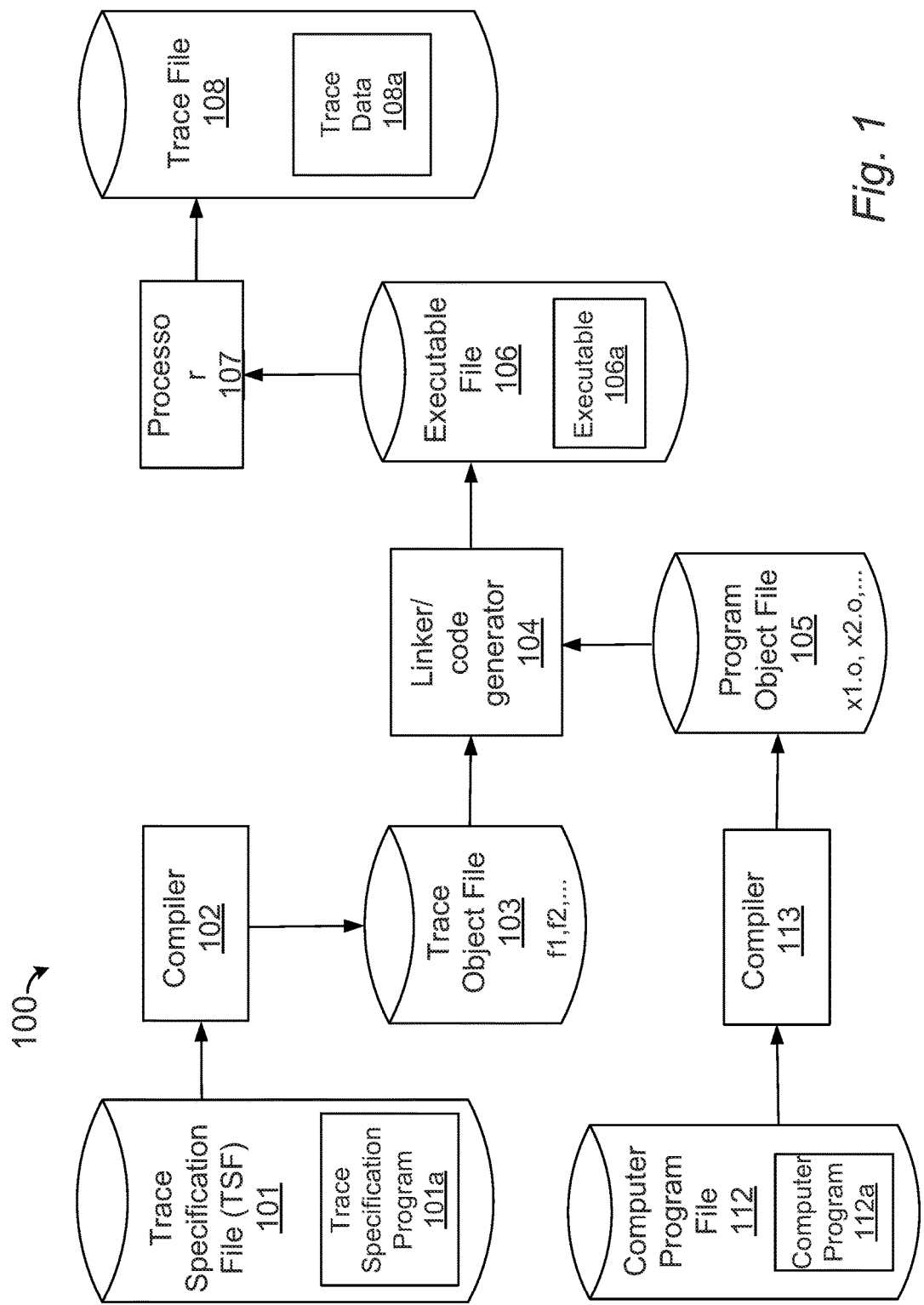
FIG. 1 is a flow diagram that illustrates tracing a computer program using a trace code generator according to embodiments of the present technology.

The present technology generally relates to a device to programmably trace a computer program, or obtain information regarding the execution of the computer program at predetermined locations or when a particular event occurs. The trace code generated from a trace specification program (TSP) may be executed at any time during, or in parallel with, the execution of the computer program. The programmable tracing is flexible and provides little, if any, intrusion with the operation of the computer program in embodiments.

Performance of the computer program may be enhanced by the reduction of the intrusion of the tracing. Tracing methods may be run concurrently with execution of the computer program, while hardware components, such a registers, may be optionally used to enhance the performance of the tracing and execution of the computer program in embodiments.

Tracing computer programs according to embodiments of the present technology may be integrated with typical tracing hardware and software components.

Recording of trace data is programmable. Accordingly, recorded trace data may be reduced by programming the recording of particular trace data at predetermined times, to allow for efficient analysis. For example, particular trace data may be recorded when a particular event or error occurs rather than continuously recording irrelevant trace data.

A code generator, such as a compiler and/or linker, may generate the trace code from a trace specification program and/or insert a call to the trace code or data at a predetermined location in the execution of the computer program. In embodiments, the trace specification program indicates trace logic, targeted functions to trace; targeted computer program variables to trace, conditions to record trace data or recording trace data format/media. One or more trace specification programs may be stored in a trace file that may be accessed by the code generator. A particular trace specification program may be used for a particular section, object, variable (group of variables) or function (or group of functions) of the computer program. A user written trace specification program or address to the user written trace program may also be included in the trace file. Multiple trace specification files that define different trace specification programs may also be used in embodiments.

It is understood that the present technology may be embodied in many different forms and should not be construed as being limited to the embodiments set forth herein. Rather, these embodiments are provided so that this disclosure will be thoroughly and completely understood. Indeed, the disclosure is intended to cover alternatives, modifications and equivalents of these embodiments, which are included within the scope and spirit of the disclosure as defined by the appended claims. Furthermore, in the following detailed description, numerous specific details are set forth in order to provide a thorough understanding of the technology. However, it will be clear that the technology may be practiced without such specific details.

FIGS. 1-5 are flowcharts that illustrate methods to trace a computer program according to embodiments of the present technology. In embodiments, flowcharts in FIGS. 1-5 are computer-implemented methods performed, at least partly, by hardware and software components illustrated in FIGS. 6-7 and as described below. In an embodiment, software components in FIG. 7, executed by one or more processors, such as processor 610 shown in FIG. 6, perform at least a portion of the methods. FIG. 8 is a block diagram that illustrates tracing hardware, including two registers, according to embodiments.

FIG. 1 is a flow diagram that illustrates tracing a computer program using a trace code generator according to embodiments of the present technology. In embodiments, a compiler 102 and linker/code generator 104, singly or in combination may be used to generate the trace code (from the trace specification program) that runs in parallel with the computer program.

In an embodiment, trace objects are generated in response to a trace specification program 101a (including trace instructions and/or definitions) stored in a trace specification file (TSF) 101. A code generator, such a compiler 102, reads trace specification program 101a to generate trace objects (or functions) f1, f2, . . . to be called at predetermined locations during execution of the computer program to be traced, such as computer program 112a stored in computer program file 112. Generated trace objects or functions f1, f2, . . . are stored in trace object file 103 by compiler 102.

A trace function f1 may cover the computer program 112a or particular functions (or group of functions) within the computer program 112a. A trace function f2 may be programmed or written by a user or generated from trace specification program 101a. A computer program 112a may have a function with multiple calls to different trace functions which may have different call-sites and/or different returns.

For example, a trace of a variable X in a computer program 112a may include compiler 102 generating a trace function f1 (from trace specification program 101a) that checks the value of X on exit from every function in the computer program 112a. When the value of X differs from its previously stored value, trace function f1 records the name of the computer program function and the new value of X (as trace data 108a in trace file 108). In addition to trace function f1, a programmer may write a trace function f2 that is stored in trace object file 103 that linker/code generator 104 (as described below) inserts at the entry of a particular function in computer program 112a.

Compiler 113, similar to compiler 102, compiles computer program 112a stored in computer program file 112 and stores program objects (x1.o, x2.o, . . . ) in program object file 105. In one embodiment, the compiler 113 and compiler 102 may be the same compiler or different compilers.

Linker/code generator 104 links trace objects (f1, f2, . . . ) stored in trace object file 103 with program objects (x1.o, x2.o, . . . ) stored in program object file 105 to form an executable computer program (executable) 106a stored in executable file 106. Linker/code generator 104 may also insert trace code (such as trace objects) or trace instructions at particular locations in program objects as specified by trace specification program 101a.

A processor 107 executes the executable 106a, including trace code stored in executable file 106. In one embodiment, a processor, such as processor 610, executes the computer instructions of executable 106a including at least one call instruction to a trace code, or a trace function, to initiate tracing and allocate trace data structures run in parallel with the execution of the computer program. The called and executed trace function then retrieves and records the trace data 108*a* in trace file 108 as specified by trace specification program 101*a*.

Figure 2:
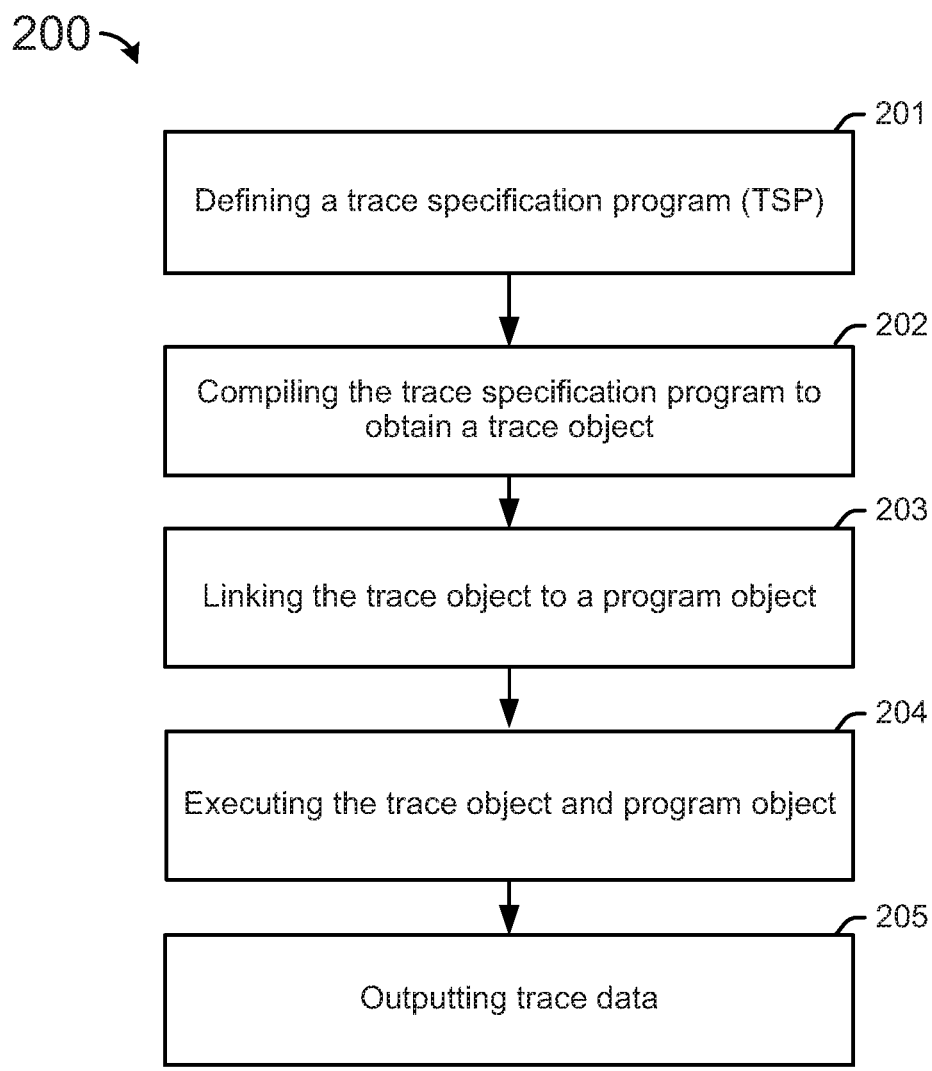
FIG. 2 is a flowchart that illustrates a method for tracing a computer program according to embodiments of the present technology.

FIG. 2 is a flowchart that illustrates a method to trace a computer program, such a computer program 112*a*, according to embodiments of the present technology. In the figure at 201, a trace specification program (TSP) is defined (or specified) and stored in a trace specification file (for example defining tracing logic and locations to trace execution and/or data, threading instructions and/or tracing output formats/media and conditions). In an embodiment, a trace specification program corresponds to trace specification program 101*a*.

At 202 a trace specification program is compiled to obtain a trace object. In an embodiment, compiler 102 outputs trace objects to trace object file 103 in response to trace specification program 101*a* stored in trace specification file 101.

At 203 the trace object is linked to a program object. In embodiments, linker/code generator 104 links trace objects stored in trace object file 103 with program objects stored in program object file 105. In an embodiment, linker/code generator 104 inserts trace code in computer program 112*a* at a location specified by trace specification program 101*a*.

At 204 an executable file including the program object and trace object is executed. In one embodiment, a processor 610 executes the computer instructions of executable 106*a* including parallel execution of the trace code.

At 205 trace data is output to a recording media, such as a trace file. In an embodiment, trace data may be a value of a variable in the program object at a predetermined locations as defined in a trace specification program. In an embodiment, a predetermined location may be an entry and/or exit of a predetermined function in the program object. Trace data may be other trace values, such as how many times a particular function was executed or called as well as a name of a particular event that occurred.

Figure 3:
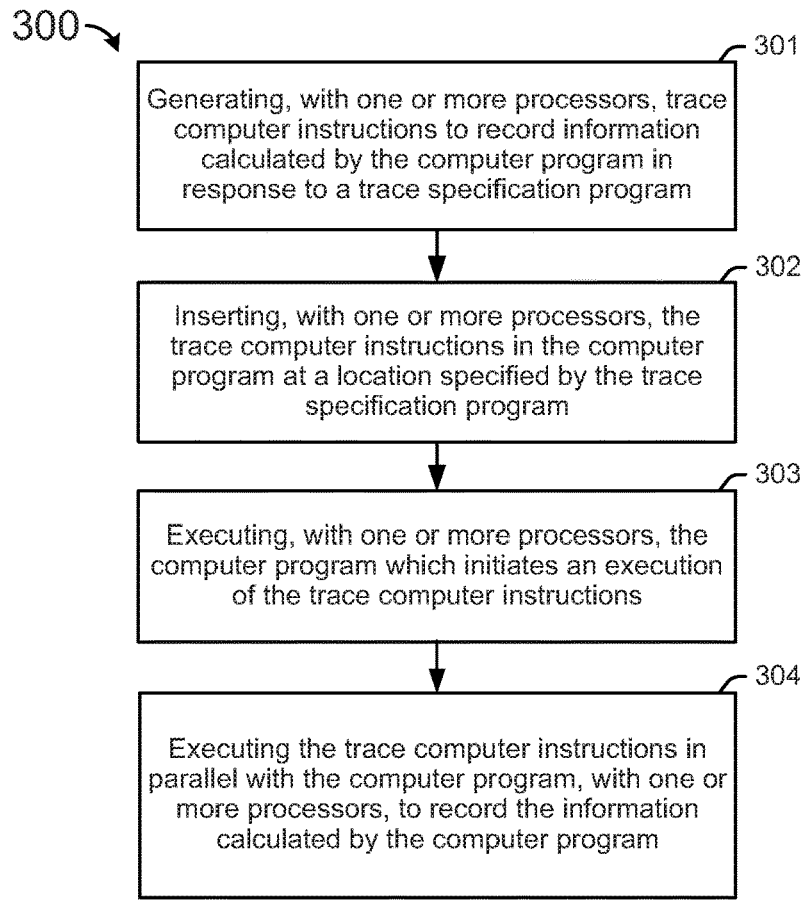
FIG. 3 is a flowchart that illustrates a method of recording information calculated by computer program instructions according to embodiments of the present technology.

FIG. 3 is a flowchart that illustrates a method for tracing a computer program according to embodiments of the present technology. In the figure at 301, with one or more processors, trace computer instructions are generated to record information calculated by computer program in response to a trace specification program. In an embodiment, the trace computer instructions correspond to trace code and the computer program corresponds to computer program 112*a*. In an embodiment, a trace specification program, and information calculated by the trace specification program, corresponds to trace specification program 101*a* and trace data 108*a*, respectively. In an embodiment, one or more processors correspond to processor 610 illustrated in FIG. 6.

At 302, with one or more processors, the trace computer instructions are inserted in the computer program at a location specified by the trace specification program. In an embodiment, the trace computer instructions include a first computer instruction that is a call instruction to a trace function.

At 303, with one or more processors, the computer program is executed which initiates an execution of the trace computer instructions.

At 304, the trace computer instructions are executed in parallel with the computer program, with the one or more processors, to record the information calculated by the computer program.

Figure 4:
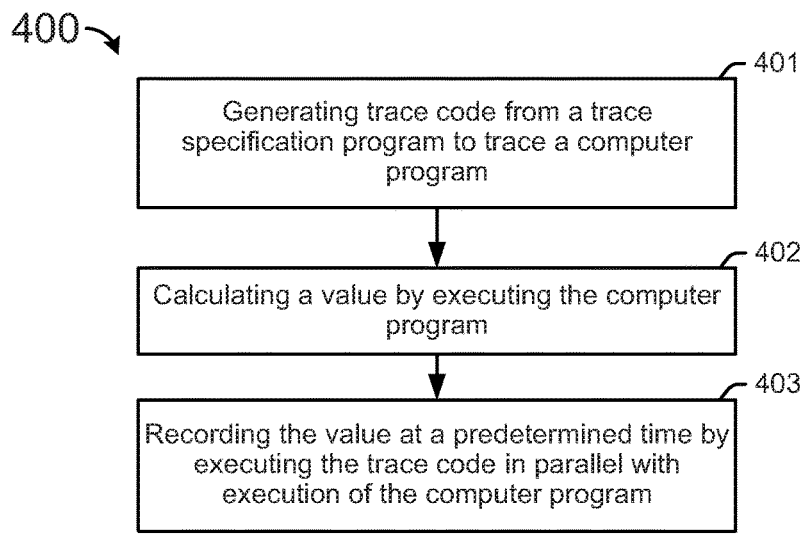
FIG. 4 is a flowchart that illustrates a method for tracing a computer program in response to a trace specification program according to embodiments of the present technology.

FIG. 4 is a flowchart that illustrates a method 400 for tracing a computer program in response to a trace specification program according to embodiments of the present technology. At 401 trace code is generated from a trace specification program to trace a computer program. In an embodiment, a compiler and/or linker, such a compiler 102 and linker/code generator 104, generate the trace code.

At 402 values at run time are calculated by executing the computer program. In an embodiment, processor 610 executes computer instructions in a first thread of the computer program.

At 403 values are recorded at a predetermined location by executing the trace code in parallel with execution of the computer program. In an embodiment, processor 610 executes computer instructions in a second thread of trace code to record the values, such as a value of a variable in a function of the computer program. The values may be recorded as trace data 108*a* in a trace media, such as trace file 108.

For example, trace functions (as well as threads to perform parallel tracing) are defined in a trace specification program. A queue Qq to hold addresses of trace functions as well as a master thread T are also defined in a trace specification program. A code generator, such as compiler 102, generates trace functions (or code), as specified by the trace specification program, before the execution of the computer program. When an inserted call instruction to a particular trace function is executed during execution of the computer program, the address of the trace function is stored in the queue Qq. The master thread T then obtains the address of the trace function from queue Qq and executes the trace function in parallel with the execution of the computer program.

In an embodiment, particular trace data may be changed by the computer program before a trace function records the particular trace data. A trace specification program may define synchronization of threads and/or access to trace data.

Figure 5:
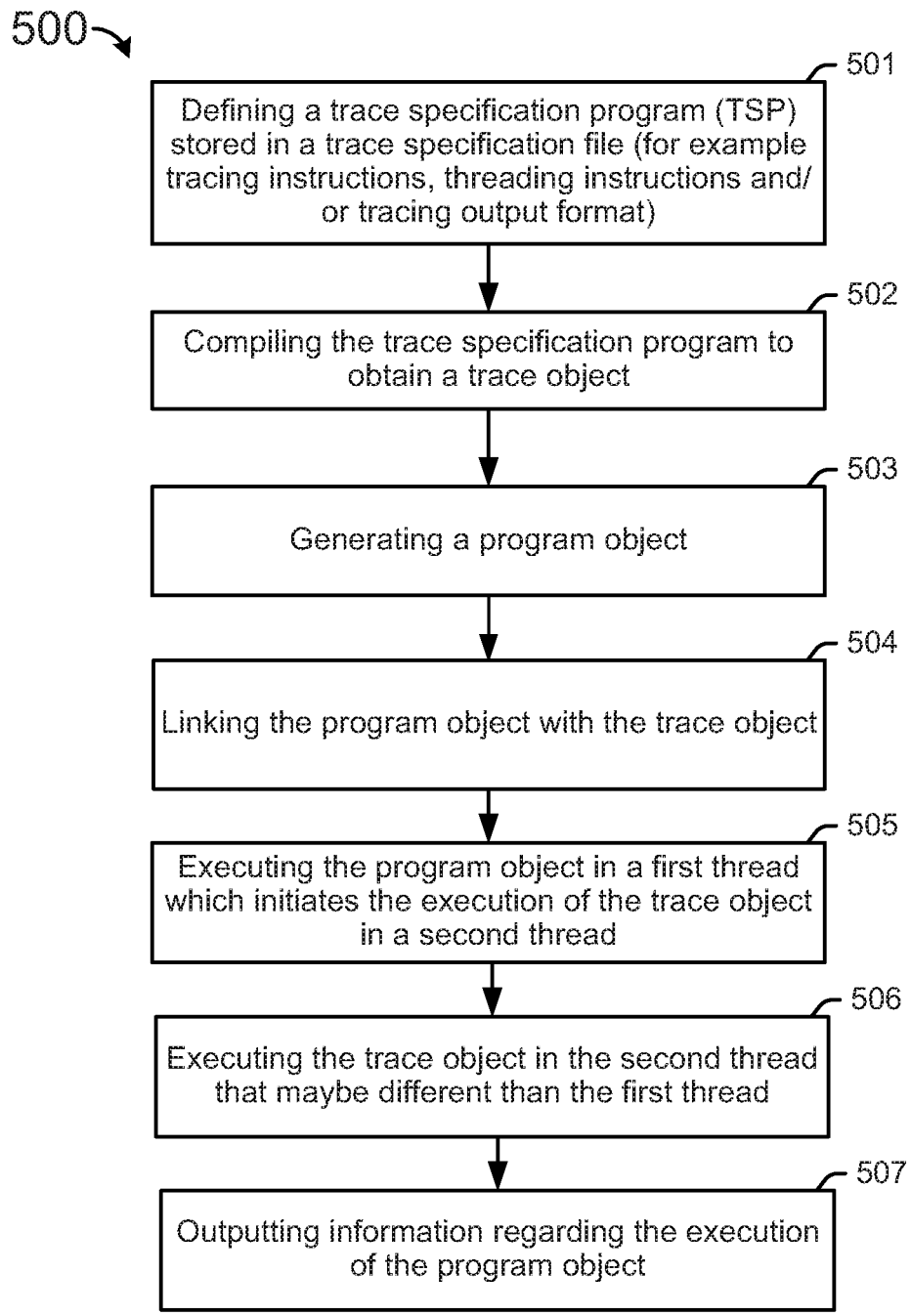
FIG. 5 is a flowchart that illustrates a method for obtaining information regarding the execution of a program object according to embodiments of the present technology.

FIG. 5 illustrates a method 500 that obtains information regarding the execution of a program object according to embodiments of the present technology.

At 501*a* trace specification program (TSP) is defined (or specified) and stored in a trace specification file. In an embodiment, a TSP defines or indicates tracing instructions, threading instructions and/or tracing output format. In an embodiment, a TSP corresponds to trace specification program 101*a*.

At 502 the TSP is compiled to obtain a trace object. In an embodiment, compiler 102 compiles trace specification program 101*a* to obtain the trace object.

At 503*a* program object is generated. In embodiments, compiler 113 is used to generate the program object and store the program object in program object file 105.

At 504 the program object is linked with the trace object. In an embodiment, linker/code generator 104 performs this function. In an embodiment, linker/code generator 104 inserts the trace code at a location specified by the trace specification program.

At 505 the program object in a first thread is executed which initiates the execution of the trace object in a second thread. In an embodiment, at least processor 107 performs the execution of the program object in the first thread.

At 506 the trace object in a second thread that may be different than the first thread is executed. In an embodiment, at least processor 107 performs the execution of the trace object in the second thread. In an embodiment, more than one thread may be used to execute trace code. In an embodiment, the second thread acts as a distributor of tracing tasks or function when needed.

At 507 information is output regarding the execution of the program object. In embodiments, the trace object outputs trace data 108*a* to trace file 108 in response to trace specification program 101a. In an embodiment, the trace object may run on a separate thread to speed up the process.

Figure 6:
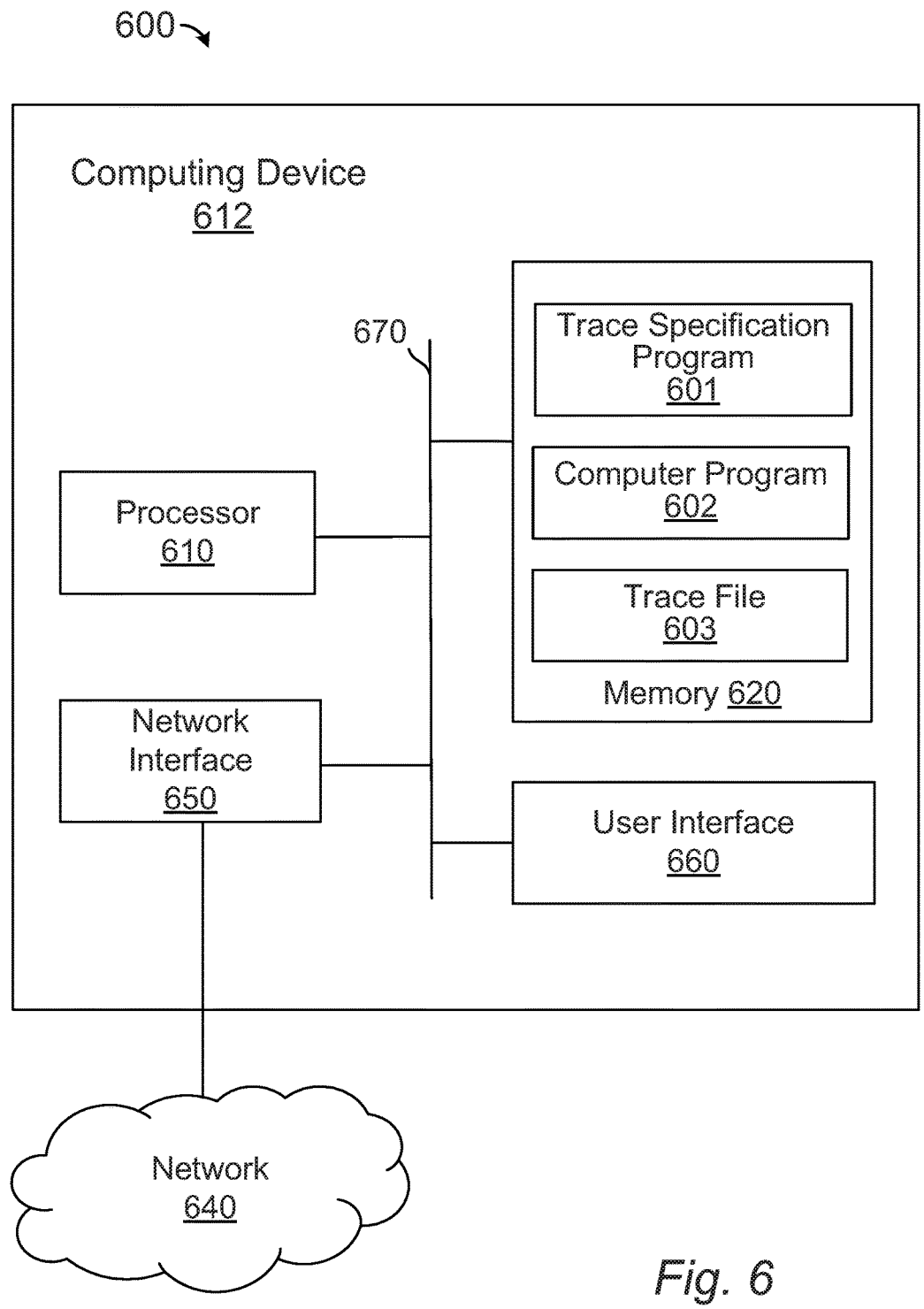
FIG. 6 is a block diagram that illustrates a computing device architecture for tracing a computer program according to embodiments of the present technology.

FIG. 6 illustrates a hardware architecture 600 for computing device 612 used to trace computer program 602. Computing device 612 may include a processor 610, memory 620, a user interface 660 and network interface 650 coupled by a interconnect 670. Interconnect 670 may include a bus for transferring signals having one or more type of architectures, such as a memory bus, memory controller, a peripheral bus or the like.

Computing device 612 may be implemented in various embodiments. Computing devices may utilize all of the hardware and software components shown, or a subset of the components in embodiments. Levels of integration may vary depending on an embodiment. For example, memory 620 may be divided into many more memories. Furthermore, a computing device 612 may contain multiple instances of a component, such as multiple processors (cores), memories, databases, transmitters, receivers, etc. Computing device 612 may comprise a processor equipped with one or more input/output devices, such as network interfaces, storage interfaces, and the like.

Computing device 612 may be embodied as different types of computing devices such as, but not limited to, wearable, personal digital assistant, cellular telephone, tablet, netbook, laptop, desktop, embedded, server and/or mainframe.

Memory 620 stores trace specification program 601, computer program 602 and trace file 603. Computer program 602 is traced in response to trace specification program 601 in which trace data is stored in trace file 603. In an embodiment, trace specification program 601, computer program 602 and trace file 603 correspond to trace specification program 101a, computer program 112a and trace file 108 shown in FIG. 1. In an embodiment, memory 620 may store compiler 102, trace object file 103, compiler 113, program object file 105, linker/code generator 104 and executable 106a, singly or in combination. In an embodiment, an operating system including a scheduler is stored in memory 620.

In an embodiment, processor 610 may include one or more types of electronic processors having one or more cores. In an embodiment, processor 610 is an integrated circuit processor that executes (or reads) computer instructions that may be included in code and/or computer programs stored on a non-transitory memory to provide at least some of the functions described herein. In an embodiment, processor 610 is a multi-core processor capable of executing multiple threads. In an embodiment, processor 610 is a digital signal processor, baseband circuit, field programmable gate array, digital logic circuit and/or equivalent.

A thread of execution (thread or hyper thread) is a sequence of computer instructions that can be managed independently in one embodiment. A scheduler, which may be included in an operating system, may also manage a thread. A thread may be a component of a process, and multiple threads can exist within one process, executing concurrently (one starting before others finish) and sharing resources such as memory, while different processes do not share these resources. In an embodiment, the threads of a process share its instructions (executable code) and its context (the values of the process's variables at any particular time).

In a single core processor, multithreading is generally implemented by time slicing (as in multitasking), and the single core processor switches between threads. This context switching generally happens often enough that users perceive the threads or tasks as running at the same time. In a multiprocessor or multi-core processor, multiple threads can be executed in parallel (at the same instant), with every processor or core executing a separate thread at least partially concurrently or simultaneously.

Memory 620 may comprise any type of system memory such as static random access memory (SRAM), dynamic random access memory (DRAM), synchronous DRAM (SDRAM), read-only memory (ROM), a combination thereof, or the like. In an embodiment, a memory 620 may include ROM for use at boot-up, and DRAM for program and data storage for use while executing computer instructions. In embodiments, memory 620 is non-transitory or non-volatile integrated circuit memory storage.

Further, memory 620 may comprise any type of memory storage device configured to store data, store computer programs including instructions, and store other information and to make the data, computer programs, and other information accessible via interconnect 670. Memory 620 may comprise, for example, one or more of a solid state drive, hard disk drive, magnetic disk drive, optical disk drive, or the like.

Computing device 612 also includes one or more network interfaces 650, which may comprise wired links, such as an Ethernet cable or the like, and/or wireless links to access network 640. A network interface 650 allows computing device 612 to communicate with remote computing devices via the networks 640. For example, a network interface 650 may provide wireless communication via one or more transmitters/transmit antennas and one or more receivers/receive antennas.

Computing device 612 communicates or transfers information by way of network 640. In an embodiment, network 640 may be wired or wireless, singly or in combination. In an embodiment, network 640 may be the Internet, a wide area network (WAN) or a local area network (LAN), singly or in combination. In an embodiment, network 640 may include a High Speed Packet Access (HSPA) network, or other suitable wireless systems, such as for example Wireless Local Area Network (WLAN) or Wi-Fi (Institute of Electrical and Electronics Engineers' (IEEE) 802.11x). In an embodiment, computing device 612 uses one or more protocols to transfer information or packets, such as Transmission Control Protocol/Internet Protocol (TCP/IP) packets. In embodiments, computing device 612 includes input/output (I/O) computer instructions as well as hardware components, such as I/O circuits to receive and output information from and to other computing devices, via network 640. In an embodiment, an I/O circuit may include at least a transmitter and receiver circuit.

In embodiments, functions described herein are distributed to other or more computing devices. In embodiments, compiler 102 and/or linker/code generator 104 may be included in a separate computing device and may be accessible by computing device 612 via network 640. In embodiments, computing device 612 may act as a server that provides a service while one or more other computing devices may act as a client. In an embodiment, computing device 612 and another computing device may act as peers in a peer-to-peer (P2P) relationship.

User interface 660 may include computer instructions as well as hardware components in embodiments. A user interface 660 may include input devices such as a touchscreen, microphone, camera, keyboard, mouse, pointing device and/or position sensors. Similarly, a user interface 660 may include output devices, such as a display, vibrator and/or speaker, to output images, characters, vibrations, speech and/or video as an output. A user interface 660 may also include a natural user interface where a user may speak, touch or gesture to provide input.

Figure 7:
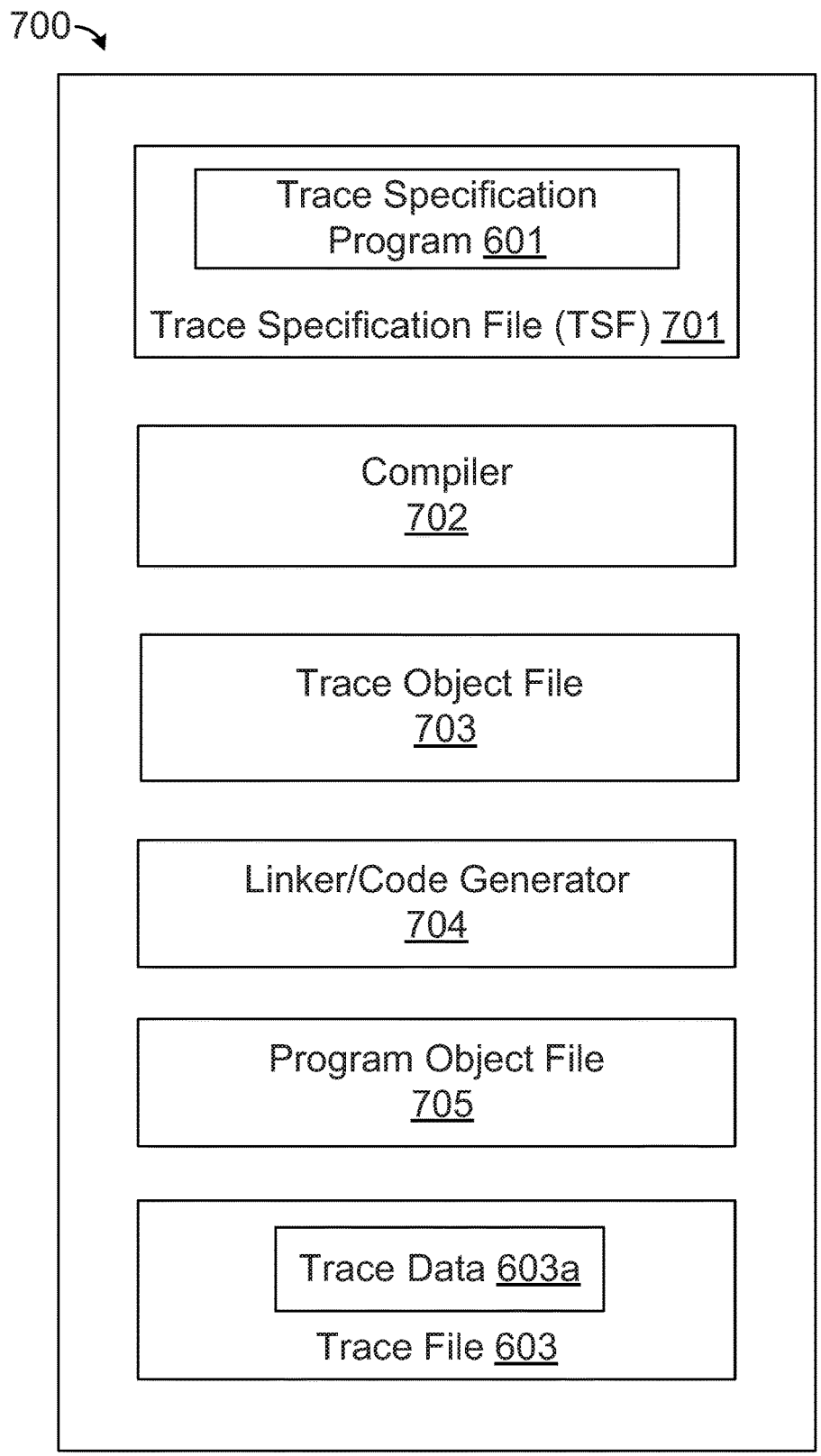
FIG. 7 is a block diagram that illustrates a software architecture for tracing a computer program according to embodiments of the present technology.
Figure 8:
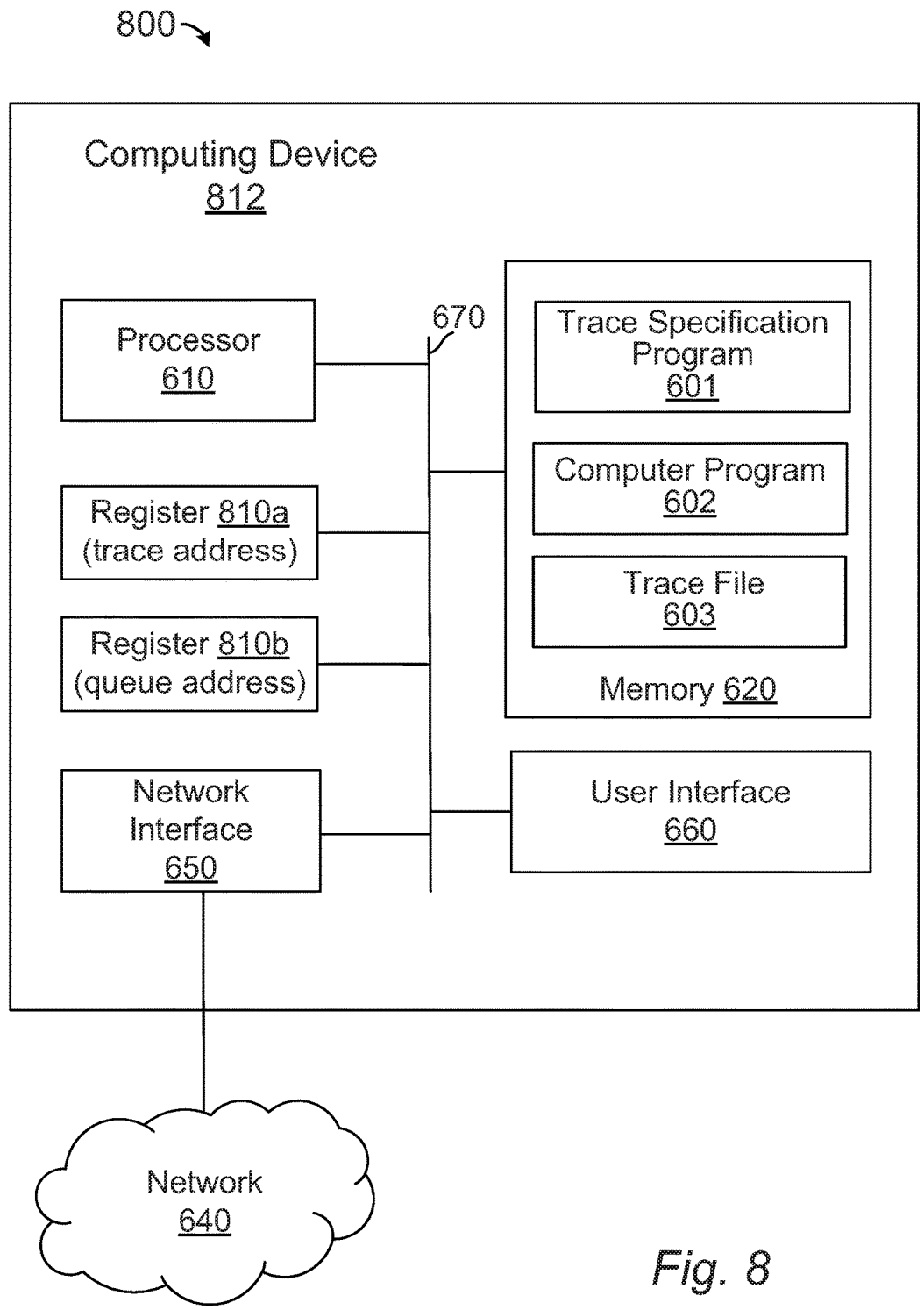
FIG. 8 is a block diagram that illustrates tracing hardware, including two registers, according to embodiments of the present technology.

FIG. 7 illustrates a software architecture 700 according to embodiments of the present technology. Software architecture 700 illustrates software components having computer instructions to trace a computer program. In embodiments, software components illustrated in software architecture 700 are stored in memory 620 of FIG. 6. In embodiments, software components illustrated in FIG. 7 may be embodied as a computer program, object, function, subroutine, method, software instance, script, a code fragment, stored in an electronic file, singly or in combination. In order to clearly describe the present technology, software components shown in FIG. 7 are described as individual software components. In embodiments, the software components illustrated in FIG. 7, singly or in combination, may be stored (in single or distributed computer-readable storage medium(s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software architecture 700 includes trace specification file (TSF) 701 storing trace specification program 601, compiler 702, trace object file 703 storing trace objects, linker/code generator 704, program object file 705 storing program objects and trace file 603 storing trace data 603a.

Trace specification file 701 stores at least one trace specification program 601 that is responsible for, among other functions, defining and/or specifying the tracing of a computer program, such as computer program 602. In embodiments, the trace specification program 601 may include tracing instructions such as conditions for what to trace (one or more variables or functions) or where to insert a call to the trace function. In embodiments, the trace specification program 601 may include threading instructions assigning particular threads and/or queues of addresses to particular tracing functions, operations or code. In embodiments, the trace specification program 601 may include output trace data that specifies how (what recording format), when, and/or where to record trace data or values. In embodiments, the trace specification program 601 may include or identify user written tracing programs and/or tracing libraries that may be used. In embodiments, there may be several trace specification files to generate trace code. In an embodiment, trace specification file 701 and trace specification program 601 corresponds to trace specification file 101 and trace specification program 101a as illustrated in FIG. 1.

Compiler 702 is responsible for, among other functions, generating trace objects from trace specification program 601 to perform a trace of a computer program, such as computer program 602. In an embodiment, compiler 702 compiles trace specification program 601 and outputs trace objects to be stored in trace object file 703.

In an embodiment, a compiler 702 is one or more computer programs (or sets of computer instructions) that transforms source code written in a programming language (the source language) into another computer language (the target language), with the latter often having a binary form known as object code. In embodiment, trace specification program 601 is written in C++ programming language. Converting a source program language to a target program language may be done to create object code or an executable program.

In an embodiment, the term "compiler" is primarily used for computer programs that translate source code from a high-level programming language to a lower level language (e.g., assembly language or machine code). When the compiled computer program can run on a computer whose processor or operating system is different from the one on which the compiler runs, the compiler is known as a cross-compiler. In an embodiment, an interpreter that executes a specification may also be considered a compiler. In embodiments, a compiler may be a specific type of translator, interpreter and/or cross-compiler. In an embodiment, compiler 702 corresponds to compiler 102 and/or compiler 113.

Trace object file 703 is responsible for, among other functions, storing trace objects that are output from compiler 702. In an embodiment, trace object file 703 corresponds to trace object file 103.

Linker/code generator 704 is responsible for, among other functions, combining objects into an executable program and/or inserting trace code in computer program at a location specified by trace specification program. In an embodiment, a linker/code generator 704 (or link editor) is one or more computer programs (or sets of computer instructions) that takes one or more objects generated by a compiler 702 and combines them into an executable program, library file, or another object. In an embodiment, a loader that writes output directly to memory may be considered a linker. In an embodiment, linker/code generator 704 combines trace objects stored in trace object file 703 with program objects stored in program object file 705 to trace a computer program. In an embodiment, the executable program is stored in an executable file, such as executable file 106a.

Program object file 705 is responsible for, among other functions, storing program objects of a computer program to be traced. In an embodiment, program object file 705 corresponds to program object file 105.

Trace file 603 is responsible for, among other functions, storing trace data 603a obtained from tracing a computer program. In embodiments, trace data may be a trace values at a predetermined location in the execution of the computer program, such as a value of a variable at the entry and/or exit of a function of the computer program. Trace data may also be the number of times a particular function was called or other trace information that would aid in debugging and/or analyzing the computer program. In an embodiment, trace file 603 and trace data 603a correspond to trace file 108 and trace data 108a.

FIG. 8 is a block diagram that illustrates tracing hardware, including two registers, according to an embodiment of the present technology. In embodiments, registers may be optionally used to minimize effects of tracing on a computer program. In an embodiment, two registers are used in a computing device 812, which has similar components shown in FIG. 6 and described herein. In particular, register 810a may be non-transitory memory in the form of a general purpose register to store a called trace function address. Register 810b may be non-transitory memory in the form of a special purpose register to store a queue address. In an embodiment, a trace function call (or computer instruction) may be inserted at predetermined locations in the computer program as described herein when using the two registers. In an embodiment, during an execution of the computer program including the inserted trace function call, an execution of the trace function call causes a hardware operation that writes the associated trace function address stored in register 810*a* to a queue at the address (queue address) stored in register 810*b*. In an embodiment, the queue is included in memory 620. A parallel tracing thread running (which may be different than the thread used to execute the computer program) reads the trace function address at the queue address and executes the trace function. In an embodiment, a zero value in register 810*b* indicates no tracing is to be performed. In an embodiment, a trace specification program defines and allocates the queue.

Advantages of the present technology may include, but are not limited to, programmably tracing a computer program, such as an application. Flexible tracing may be programmed for a section or an entire computer program, or application. Tracing code runs in parallel with zero or minimum intrusion to the computer program. Hardware registers may be used that enable intrusion of the computer program to be nearly zero. In an embodiment, parallel tracing provides a higher performance of the computer program as compared to sequential tracing. Obtaining tracing data is easy as compared to other methods. In embodiments, the present tracing technology may be integrated with existing tracing hardware and software. Smaller trace files may be generated for analysis by programming out unwanted trace data.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a device having one or more processors executing instructions stored in non-transitory memory, a computer-implemented method, and/or non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A non-transitory computer-readable medium storing computer instructions, that when executed by one or more processors, cause the one or more processors to:
obtain a trace specification program stored in a trace specification file, the trace specification program comprising trace code, thread instructions, a predetermined location and an output format, wherein the trace specification program further indicates conditions to record trace data and trace media to record information;
compile the trace specification program to generate one or more trace objects each comprising respective trace code, wherein the trace code indicates at least one of: at least one function in the one or more program objects to trace, at least one variable in the one or more program objects to trace, or conditions in which particular values are output to the trace media:
generate one or more program objects;
link the one or more program objects with the one or more trace objects, wherein a call to the trace code is inserted into a program to be traced at the predetermined location during execution of the program;
execute the one or more program objects in a first thread, with execution of the first thread initiating execution of the one or more trace objects in a second thread, wherein the one or more trace objects are executed in parallel with the execution of the one or more program objects;
execute the one or more trace objects in the second thread as specified by the thread instructions; and
output information regarding the execution of the program object in the output format defined by the specification program to the trace media, wherein the information output includes recording the trace data at predetermined times.

2. The non-transitory computer-readable medium of claim 1, wherein the information includes values calculated by the one or more program objects and the first thread is different from the second thread.

3. The non-transitory computer-readable medium of claim 1, wherein the one or more trace objects are executed in response to a call instruction in the one or more program objects being executed.

4. The non-transitory computer-readable medium of claim 1, wherein the trace code indicates a predetermined location in the one or more program objects to execute the one or more trace objects.

5. A device, comprising:
a non-transitory memory storage comprising instructions; and
one or more processors in communication with the memory, wherein the one or more processors execute the instructions to:
obtain a trace specification program stored in a trace specification file, the trace specification program comprising trace code, thread instructions, a predetermined location and an output format, wherein the trace specification program further indicates conditions to record trace data and trace media to record information;
compile the trace specification program to generate one or more trace objects each comprising respective trace code, wherein the trace code indicates at least one of: at least one function in the one or more program objects to trace, at least one variable in the ono or more program objects to trace, or conditions in which particular values are output to the trace media:
generate one or more program objects;
link the one or more program objects with the one or more trace objects, wherein a call to the trace code is inserted into a program to be traced at the predetermined location during execution of the program;
execute the one or more program objects in a first thread, with execution of the first thread initiating execution of the one or more trace objects in a second thread, wherein the one or more trace objects are executed in parallel with the execution of the one or more program objects;
execute the one or more trace objects in the second thread as specified by the thread instructions; and
output information regarding the execution of the program object in the output format defined by the specification program to the trace media, wherein the information output includes recording the trace data at predetermined times.

6. The device of claim 5, wherein the information includes values calculated by the one or more program objects and the first thread is different from the second thread.

7. The device of claim 5, wherein the one or more trace objects are executed in response to a call instruction in the one or more program objects being executed.

8. The device of claim 5, wherein the trace code indicates a predetermined location in the one or more program objects to execute the one or more trace objects.

9. A computer-implemented method, comprising:
obtaining, with one or more processors, a trace specification program stored in a trace specification file, the trace specification program comprising trace code, thread instructions, a predetermined location and an output format, wherein the trace specification program further indicates conditions to record trace data and trace media to record information;
compiling, with the one or more processors, the trace specification program to generate one or more trace objects each comprising respective trace code, wherein the trace code indicates at least one of: at least one function in the one or more program objects to trace, at least one variable in the one or more program objects to trace, or conditions in which particular Values are output to the trace media;
generating, with the one or more processors, one or more program objects;
linking the one or more program objects with the one or more trace objects, wherein a call to the trace code is inserted into a program to be traced at the predetermined location during execution of the program;
executing, with the one or more processors, the one or more program objects in a first thread, with execution of the first thread initiating execution of the one or more trace objects in a second thread, wherein the one or more trace objects are executed in parallel with the execution of the one or more program objects;
executing, with the one or more processors, the one or more trace objects in the second thread as specified by the thread instructions; and outputting, with the one or more processors, information regarding the execution of the program object in the output format defined by the specification program to the trace media, wherein the information output includes recording the trace data at predetermined times.

10. The computer-implemented method of claim 9, wherein the information includes values calculated by the one or more program objects and the first thread is different from the second thread.

11. The computer-implemented method of claim 9, wherein the one or more trace objects are executed in response to a call instruction in the one or more program objects being executed.

12. The computer-implemented method of claim 9, wherein the trace code indicates a predetermined location in the one or more program objects to execute the one or more trace objects.

* * * * *